Sept. 18, 1923.

E. A. LAUGHLIN

CAR MOUNTING

Filed Sept. 12, 1921

1,468,596

2 Sheets-Sheet 1

Witnesses:
Wm. Schnellhardt.
B. J. Richards

Inventor
Elmyr A. Laughlin
By Joshua R. H.
His Attorney

Sept. 18, 1923.

E. A. LAUGHLIN

CAR MOUNTING

Filed Sept. 12, 1921

1,468,596

2 Sheets-Sheet 2

Witnesses:

Inventor
Elmyr A Laughlin
By Joshua R. H. Potts
His Attorney

Patented Sept. 18, 1923.

1,468,596

UNITED STATES PATENT OFFICE.

ELMYR A. LAUGHLIN, OF OREGON, ILLINOIS.

CAR MOUNTING.

Application filed September 12, 1921. Serial No. 500,062.

*To all whom it may concern:*

Be it known that I, ELMYR A. LAUGHLIN, a citizen of the United States, and a resident of the city of Oregon, county of Ogle, and State of Illinois, have invented certain new and useful Improvements in Car Mountings, of which the following is a specification.

My invention relates to improvements in car mountings, and has for its object the provision of a simple and effective construction of this character arranged and adapted to alleviate friction in the operation of the car. Another object of the invention is the provision of a simple and effective car mounting arranged and adapted to alleviate side swaying or movement of the car in travel.

Other objects will appear hereinafter.

The invention consists in the combinations and arrangements of parts hereinafter described and claimed.

Figure 1:
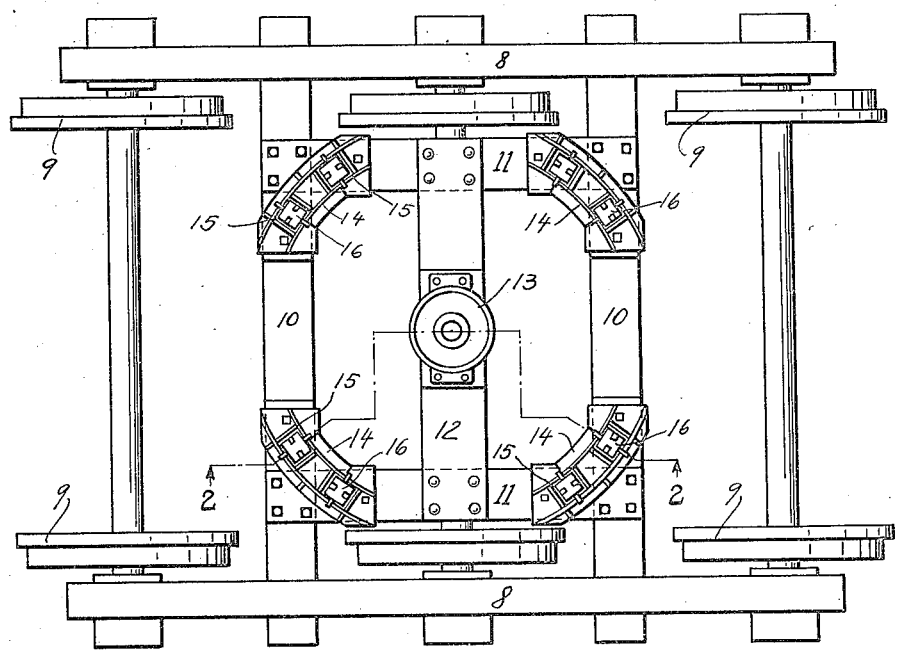
Figure 2:
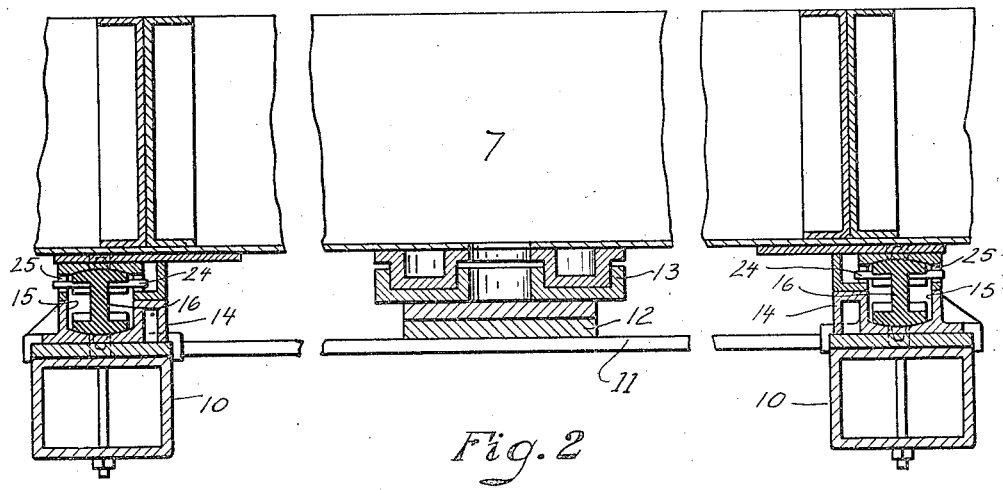
Figure 3:
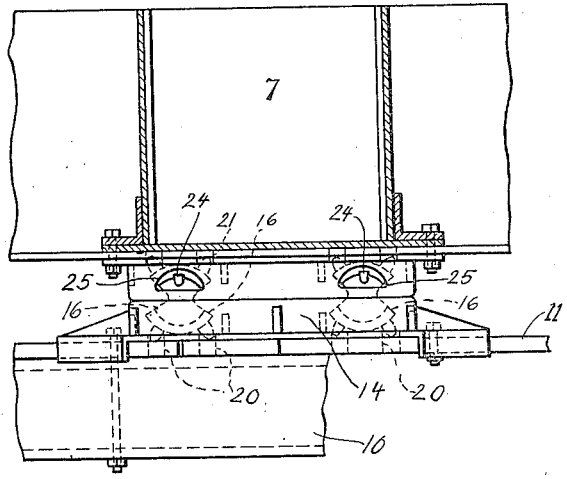
Figure 4:
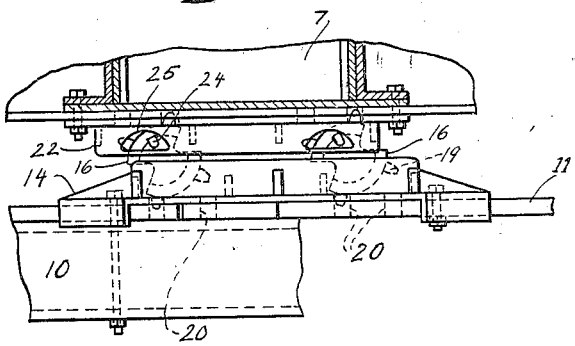
Figure 6:
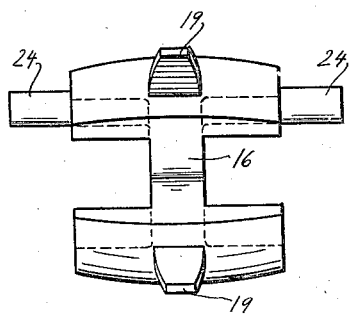
Figure 5:
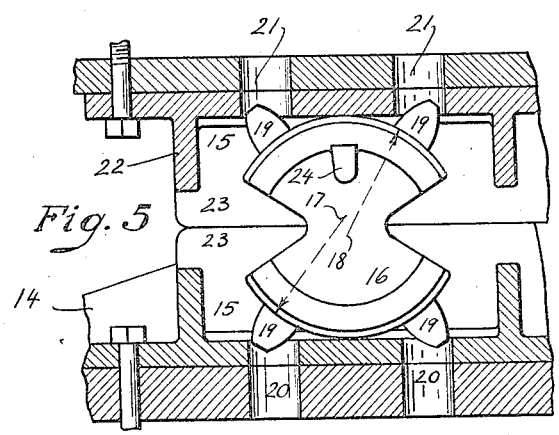

The invention will be best understood by reference to the accompanying drawings forming a part of this specification, and in which, Fig. 1 is a top plan view of a truck equipped with bearing means embodying the invention;

Fig. 2, an enlarged longitudinal section of the same taken substantially on line 2—2 of Fig. 1;

Fig. 3, an enlarged elevation, shown partially in section, of one of the bearings employed in the construction;

Fig. 4, a view similar to Fig. 3 but showing the positions assumed by the parts when the car turns;

Fig. 5, an enlarged detail section taken through one of the bearing members; and Fig. 6, a detail view of one of a plurality of rocker members employed in the construction.

The preferred form of construction as illustrated in the drawings comprises car body bolsters 7 of any usual or desired construction, two of which are provided across each end of the car. Each end of the car is mounted upon the usual truck 8 which is provided with six flanged wheels 9 running on the tracks in the usual way. Each truck 8 is equipped with two cross bolsters 10 on which are mounted longitudinal supporting beams 11 carrying a central supporting bolster 12 upon which the pivotal mounting 13 is centrally positioned and serves as the usual pivotal mounting of the car body on the truck. The arrangement is such that a substantially square supporting frame is formed in the truck with the pivotal mounting of the car located substantially centrally in said frame.

Arranged at the four corners of this supporting frame are bearing housings 14 in segmental form and having a curvature about the center of the bearing 13. Each housing 14 is provided with two pockets 15 in each of which is positioned a rocker 16. Each rocker 16 is eccentric in form, the lower surface thereof being struck from an upper center 17 and the upper surface thereof being struck from a lower center 18 as indicated in Fig. 5, and whereby each rocker tends to normally assume a vertical position as will be readily understood. Each rocker is provided on its upper and lower surfaces with teeth 19, the teeth on the lower surface operating in suitable holes or sockets 20 in the bottom of housing 14. The teeth on the upper surface of said rocker operate in corresponding holes or sockets 21 provided in a co-operating bearing housing 22 secured to the corresponding bolster 7 in registration with each housing 14, the housings 22 being similar in all respects to the housings 14 as indicated and similarly engaging the upper ends of the rockers 16. The housings 22 and 14 are provided with bearing extensions 23 arranged to contact with each other when the truck is in normal central position as shown. When the truck turns, however, the eccentric shape of the rockers 16 serve to separate the bearing members 23 as shown in Fig. 4.

Each rocker member is provided at its upper side portions with laterally extending lugs or arms 24 fitting into corresponding openings 25 in the upper housing 22, the lugs 24 and the teeth 19 operating and co-operating to constantly maintain the rockers in proper positions in the housings during various movements of said housings in the operation of the car.

In operation as the car travels along a straight track with the trucks in normal position thereunder, the bearing members 23 rest in contact with each other and thus take the load off of the rockers 16. When a curve in the road is encountered the truck is forced to turn relatively to the car body, thus rocking the rockers 16 and elevating the bearing members 23 from contact with each other as illustrated in Fig. 4, so that the car body then rides upon the rockers 16. Owing to the eccentric shape of the rockers 16 the rockers always tend to assume normal central positions in the housings and thus tend to return the truck to normal central straight-ahead position, so that when the car runs off of the curve onto the straight track the trucks will be restored automatically to straight-ahead position and friction between the wheel flanges and the rails avoided. Likewise, any departure from central position tends to elevate the car body and thus prevents or alleviates side movement or swaying of the car. Owing to the fact that the bearing members are located both forward and back and laterally displaced with reference to the pivotal mounting of the car an efficient and adequate support for the car is provided which will prevent lateral tilting of the car on the track and thus dispense with any necessity for the provision of the usual side bearing for this purpose.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claim.

Having described my invention, what I claim as new and desire to secure by Letters Patent is:

The combination with a car body and truck therefor, of two supporting members laterally traversing said truck; longitudinal supporting members supported on said lateral members and forming therewith a substantially rectangular supporting frame; a cross member extending substantially centrally through said supporting frame; a pivotal mounting for said car body situated substantially centrally of said central supporting member; and bearing members interposed between said body and said frame and arranged substantially at the four corners of said frame, substantially as described.

In testimony whereof I have signed my name to this specification in the presence of two subscribing witnesses.

ELMYR A. LAUGHLIN.

Witnesses:
 CLARENCE E. THREEDY,
 BRAYTON G. RICHARDS.